(12) United States Patent
Shigenaga

(10) Patent No.: US 8,902,240 B2
(45) Date of Patent: Dec. 2, 2014

(54) IMAGE PROCESSING DEVICE

(75) Inventor: Satoshi Shigenaga, Kanagawa (JP)

(73) Assignee: Panasonic Corporation, Osaka (JP)

(*) Notice: Subject to any disclaimer, the term of this patent is extended or adjusted under 35 U.S.C. 154(b) by 908 days.

(21) Appl. No.: 13/058,921

(22) PCT Filed: Aug. 11, 2009

(86) PCT No.: PCT/JP2009/003864
§ 371 (c)(1),
(2), (4) Date: Feb. 14, 2011

(87) PCT Pub. No.: WO2010/018688
PCT Pub. Date: Feb. 18, 2010

(65) Prior Publication Data
US 2011/0134133 A1  Jun. 9, 2011

(30) Foreign Application Priority Data
Aug. 15, 2008 (JP) .................... 2008-209271

(51) Int. Cl.
| | |
|---|---|
| G09G 5/39 | (2006.01) |
| G09G 5/00 | (2006.01) |
| G06T 1/60 | (2006.01) |
| G06T 9/00 | (2006.01) |
| G09G 5/399 | (2006.01) |
| H04N 19/423 | (2014.01) |
| H04N 19/436 | (2014.01) |
| H04N 19/20 | (2014.01) |
| G09G 5/18 | (2006.01) |

(52) U.S. Cl.
CPC *G09G 5/001* (2013.01); *G06T 1/60* (2013.01); *G06T 9/00* (2013.01); *G09G 5/399* (2013.01); *H04N 19/00484* (2013.01); *H04N 19/00521* (2013.01); *H04N 19/00387* (2013.01); *G09G 5/18* (2013.01); *G09G 2340/125* (2013.01)
USPC .......................................................... 345/531

(58) Field of Classification Search
CPC ............. G09G 2340/0435; G09G 2360/18; G09G 2340/125
USPC .......................................................... 345/531
See application file for complete search history.

(56) References Cited

U.S. PATENT DOCUMENTS

| | | | |
|---|---|---|---|
| 5,815,169 A | 9/1998 | Oda | |
| 5,929,871 A | 7/1999 | Komeichi | |
| 6,333,745 B1 | 12/2001 | Shimomura et al. | |
| 2007/0165035 A1* | 7/2007 | Duluk et al. | 345/506 |
| 2010/0033555 A1* | 2/2010 | Nagase et al. | 348/43 |

FOREIGN PATENT DOCUMENTS

| | | |
|---|---|---|
| JP | 5-165445 | 7/1993 |
| JP | 8-278779 | 10/1996 |
| JP | 9-325745 | 12/1997 |
| JP | 10-78770 | 3/1998 |

(Continued)

*Primary Examiner* — Xiao Wu
*Assistant Examiner* — Wynton S Jones
(74) *Attorney, Agent, or Firm* — Greenblum & Bernstein, P.L.C.

(57) ABSTRACT

An image processing device improves processing performance at low cost. The image processing device is provided with a memory controller that divides up and assigns banks accessed by a video inputter, a drawer, and a video outputter to multiple frame memories. The image processing device arbitrates access requests from master units, such as the video inputter, the drawer, and the video outputter, and controls data transmission so that the multiple master units can access both the frame memories in parallel.

12 Claims, 15 Drawing Sheets

(56) References Cited

FOREIGN PATENT DOCUMENTS

| | | |
|---|---|---|
| JP | 10-207821 | 8/1998 |
| JP | 11-510620 | 9/1999 |
| JP | 2001-92429 | 4/2001 |
| JP | 2004-252481 | 9/2004 |
| JP | 2005-017867 | 1/2005 |
| JP | 2005-338498 | 12/2005 |
| JP | 3919766 | 2/2007 |
| JP | 2007-333892 | 12/2007 |
| WO | 97/06523 | 2/1997 |

* cited by examiner

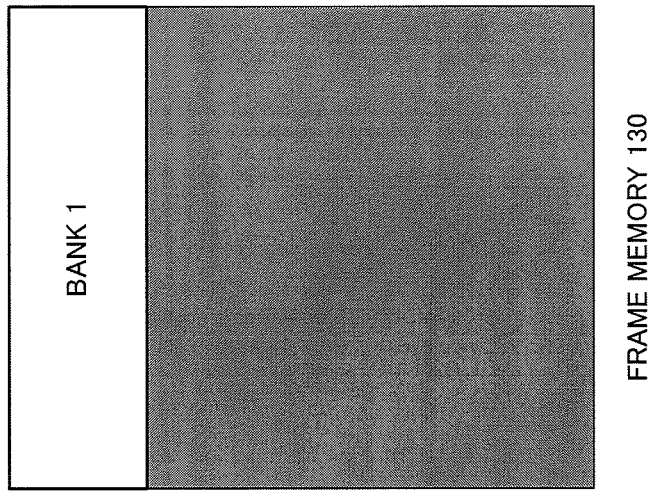
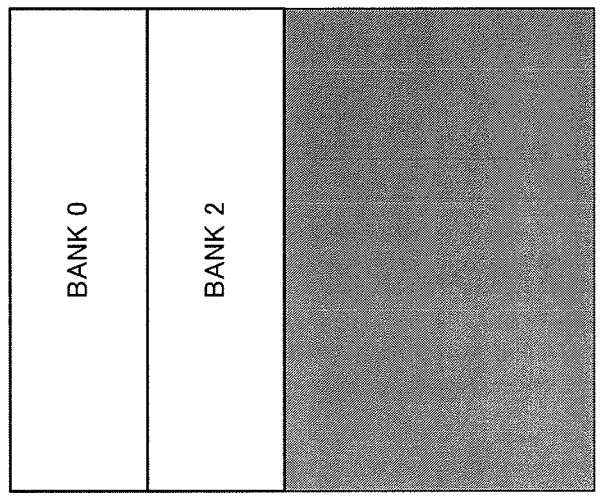
FIG.7

| ACCESS SITUATION OF VIDEO INPUT SECTION 140 | ACCESS SITUATION OF VIDEO OUTPUT SECTION 160 | BANK TO WHICH DRAWING SECTION 150 COMPLETED ACCESS LAST TIME | NEXT BANK TO BE ACCESSED BY DRAWING SECTION 150 |
|---|---|---|---|
| FRAME MEMORY 120 | FRAME MEMORY 120 | RA0/RA1/RB1 | RB0 |
| | | RB0 | RB1 |
| | FRAME MEMORY 130 | RA0/RA1 | RB0 |
| | | RB0/RB1 | RA0 |
| FRAME MEMORY 130 | FRAME MEMORY 120 | RA0/RA1 | RB0 |
| | | RB0/RB1 | RA0 |
| | FRAME MEMORY 130 | RA0 | RA1 |
| | | RA1/RB0/RB1 | RA0 |

FIG.12

IMAGE PROCESSING DEVICE

TECHNICAL FIELD

The present invention relates to an image processing apparatus that displays video input images and graphics superimposed on each other.

BACKGROUND ART

In recent years, there are a growing number of systems that display a plurality of images superimposed on each other. In the case of a car-mounted display in particular, various images such as an air-conditioner operation screen, car navigation screen, DVD (Digital Versatile Disk) or TV images need to be displayed superimposed on each other.

Conventionally, as a method for displaying a plurality of images superimposed on each other, there is a proposal of a method having a plurality of video input images, drawings and frame memories corresponding thereto (e.g., see Patent Literature 1).

CITATION LIST

Patent Literature

PTL 1
Japanese Patent Application Laid-Open No. 2004-252481

SUMMARY OF INVENTION

Technical Problem

However, such a conventional image processing apparatus has the following problems.

(1) Having frame memories corresponding to a plurality of video input images and graphics results in a cost increase.

(2) If each memory has a double buffering region and is a general single port memory, a memory write operation and a memory read operation contend each other, deteriorating processing performance.

The present invention has been made in view of the above described problems, and it is therefore an object of the present invention to provide an image processing apparatus capable of improving processing performance at low cost.

Solution to Problem

The image processing apparatus of the present invention adopts a configuration provided with a plurality of frame memories, a plurality of master sections that access the plurality of frame memories, a memory controller section that arbitrates between access requests from the plurality of master sections and controls data transfers so that the plurality of master sections can access the respective frame memories in parallel, a video input section that writes image input data to the plurality of frame memories via the memory controller section, and a video output section that reads the data stored in the plurality of frame memories through the memory controller section and displays the data on a display, wherein the memory controller section divides and allocates a plurality of banks accessed by the video input section and the video output section between/to the plurality of frame memories, and the video output section reads the last bank to which the video input section completed a write.

Advantageous Effects of Invention

According to the present invention, providing a memory controller section that controls data transfer so as to be accessible to a plurality of master sections in parallel, eliminates the necessity to have frame memories corresponding to respective video input images and drawings, can perform access to frame memories for video input, drawing and display in parallel, and can thereby improve processing performance at low cost.

BRIEF DESCRIPTION OF DRAWINGS

FIG. 7 is a diagram illustrating memory contents when three banks are allocated so as to be accessed by the video input section and the video output section of the image processing apparatus according to Embodiment 1;

FIG. 12 is a diagram illustrating the bank the control section commands the drawing section to access next according to access situations of the video input section and the video output section of the image processing apparatus according to Embodiment 1;

DESCRIPTION OF EMBODIMENTS

Hereinafter, embodiments of the present invention will be described in detail with reference to the accompanying drawings.

(Embodiment 1)

Figure 1:
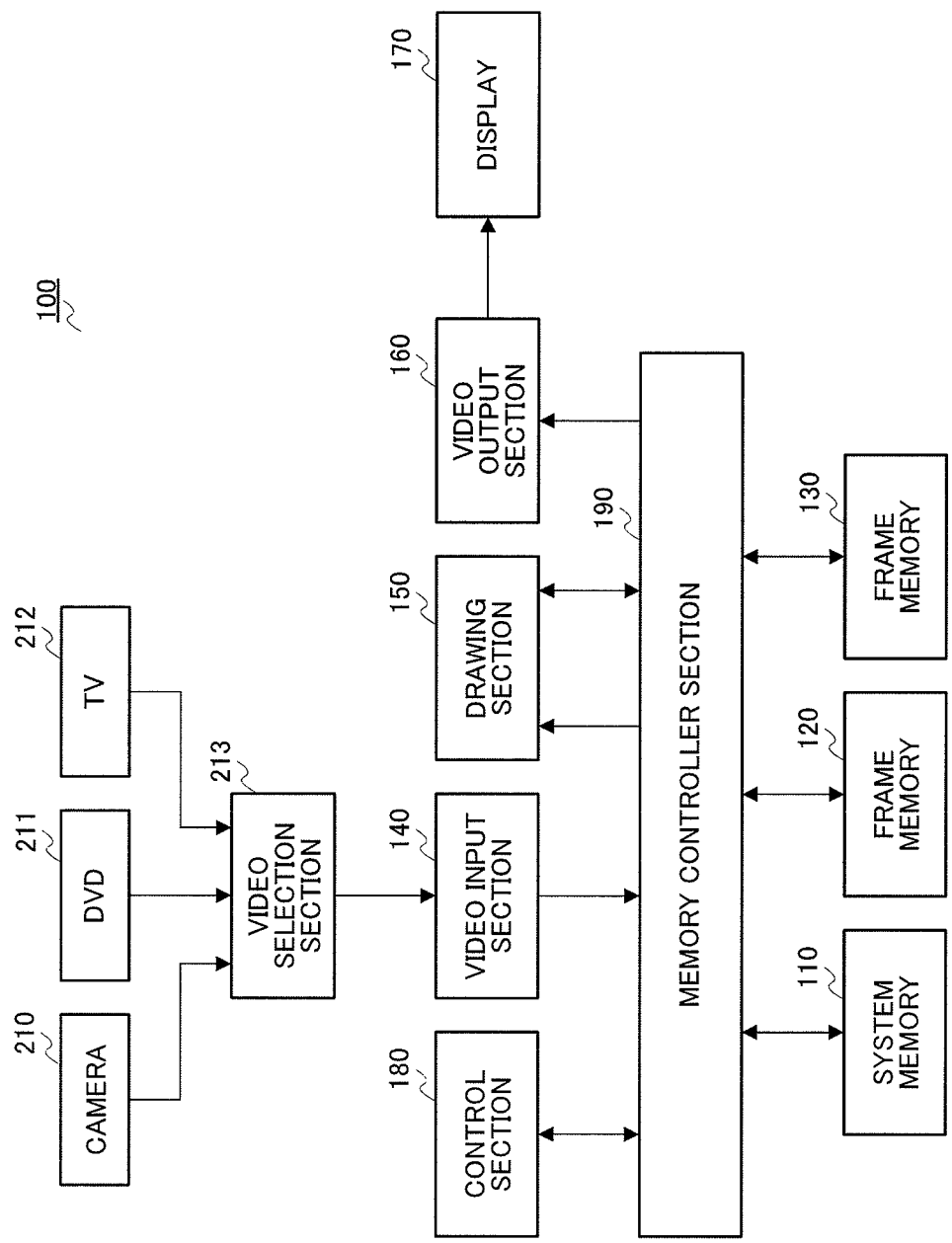
FIG. 1 is a block diagram illustrating a configuration of an image processing apparatus according to Embodiment 1 of the present invention.

FIG. 1 is a block diagram illustrating a configuration of an image processing apparatus according to Embodiment 1 of the present invention. The present embodiment is an example where the present invention is applied to an image processing apparatus that displays video input images and graphics superimposed on each other.

In FIG. 1, image processing apparatus 100 is comprised of system memory 110, frame memory 120, frame memory 130, video input section 140, drawing section 150, video output section 160, display 170, control section 180 and memory controller section 190 Furthermore, camera 210, DVD 211 and TV 212 are connected to video input section 140 via video selection section 213. Video selection section 213 selects an image signal outputted from camera 210, DVD 211 or TV 212.

System memory 110 stores application programs such as control of video input/output and drawing control, and texture data used for drawing. A ROM or flash memory is used as system memory 110, but a RAM such as SRAM or DRAM may also be used.

Frame memories 120 and 130 store video input images, drawing data and calculation results. A DRAM is generally used for frame memories 120 and 130, but an SRAM, flash memory or hard disk may also be used. Furthermore, both frame memory 120 and frame memory 130 may be incorporated in a system LSI or one or both of the two may also be configured as external circuitry.

Video input section 140 writes video input data to frame memories 120 and 130 via memory controller section 190. Video input section 140 receives a video signal selected by video selection section 213 and video input section 140 writes video data to frame memory 120 or frame memory 130 via memory controller section 190 based on a vertical synchronization signal and a horizontal synchronization signal of the inputted video.

Camera 210, DVD 211 and TV 212 are merely taken as examples of blocks that output a video signal, and may also output other video signals.

Drawing section 150 reads texture data stored in system memory 110 via memory controller section 190 and writes drawing data resulting from applying texture mapping or alpha blending processing to graphics such as a line, triangle and rectangle based on a command from control section 180 to frame memory 120 or frame memory 130 via memory controller section 190. The internal configuration of drawing section 150 will be described later in FIG. 2.

A data bus to access system memory 110 and a data bus to access frame memory 120 or frame memory 130 may be independent of each other or shared.

Video output section 160 reads data stored in frame memories 120 and 130 via memory controller section 190 and displays the data on display 170. Video output section 160 reads image data stored in frame memory 120 or frame memory 130 via memory controller section 190, applies layer synthesis or image quality adjustment processing and then displays the data on display 170.

Video input section 140 and video output section 160 above divide and allocate a plurality of banks accessed between/to a plurality of frame memories 120 and 130 and video output section 160 above reads the last bank to which video input section 140 completed a write.

Control section 180 controls video input section 140, drawing section 150, video output section 160 and memory controller section 190 based on the application program stored in system memory 110. Furthermore, control section 180 writes calculation results such as JPEG decoding to frame memory 120 or frame memory 130 via memory controller section 190. To be more specific, control section 180 writes the calculation results to frame memories 120 and 130 which are in a non-access state based on memory access start/end timing of video input section 140 and video output section 160 and information as to which of frame memories 120 and 130 is being accessed.

Memory controller section 190 arbitrates between access requests from blocks (master sections) that access frame memories 120 and 130 and control data transfers so that a plurality of master sections can access respective frame memories 120 and 130 in parallel. Here, memory controller section 190 arbitrates between memory access requests from master sections such as video input section 140, drawing section 150, video output section 160 and control section 180 and controls data transfers so that the plurality of master sections can access system memory 110, frame memory 120 and frame memory 130 in parallel.

For example, when control section 180 requests access to system memory 110, video input section 140 requests access to frame memory 120, drawing section 150 requests access to frame memory 130 and video output section 160 requests access to frame memory 130, memory controller section 190 performs control so that data transfers between control section 180 and system memory 110, between video input section 140 and frame memory 120, and between video output section 160 and frame memory 130 are performed in parallel. Thus, data transfer of drawing section 150 is started after the data transfer of video output section 160 is finished.

On that basis, when each master section determines which bank to access next, memory controller section 190 selects a bank allocated to the frame memory having the least factor to be accessed based on the situation of access of each master section to each frame memory 120 or 130.

Memory controller section 190 divides and allocates a plurality of banks accessed by drawing section 150 and video output section 160 between/to the plurality of frame memories 120 and 130, and when drawing section 150 determines which bank to access next, memory controller section 190 selects a bank allocated to frame memory 120 or 130 having the least factor to be accessed based on information about which of frame memories 120 and 130 video input section 140 and video output section 160 are accessing or which of frame memories 120 and 130 input section 140 and video output section 160 will access next when they are accessing none of frame memories 120 and 130, and information about the bank to which drawing section 150 completed access last time.

Figure 2:
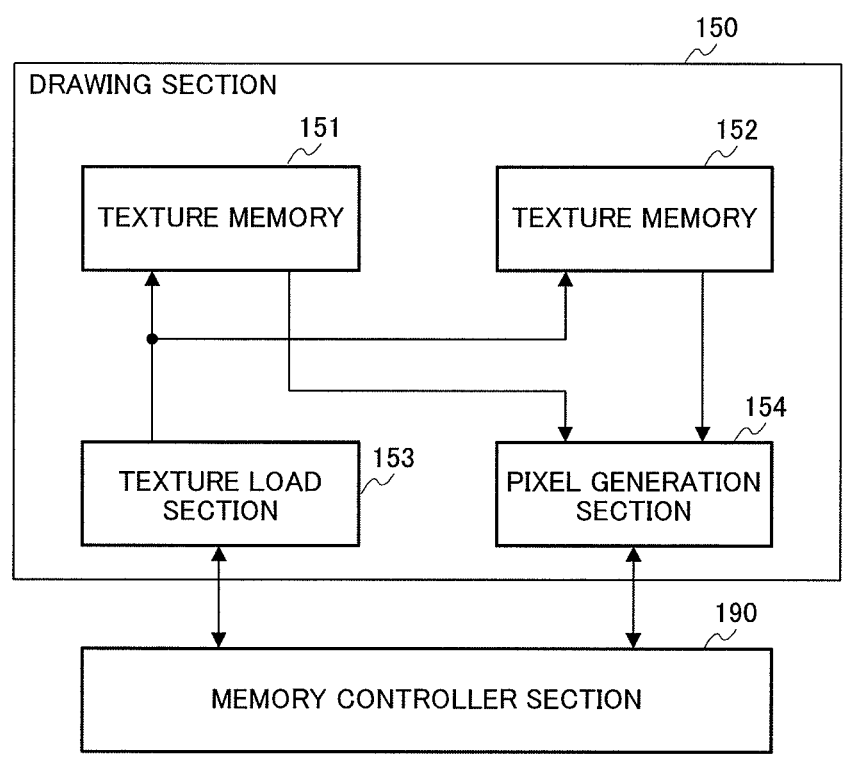
FIG. 2 is a diagram illustrating an internal configuration of a drawing section of the image processing apparatus according to Embodiment 1.

FIG. 2 is a diagram illustrating an internal configuration of drawing section 150 above.

In FIG. 2, drawing section 150 is comprised of a plurality of texture memories 151 and 152, texture load section 153 and pixel generation section 154.

Texture memories 151 and 152 are memories for storing texture data.

Texture load section 153 reads texture data stored in system memory 110 via memory controller section 190 and writes the texture data to one of texture memory 151 and texture memory 152.

Pixel generation section 154 reads texture data stored in texture memory 151 or texture memory 152 and writes drawing data generated by applying texture mapping or alpha blending processing to graphics such as a line, triangle or rectangle to frame memory 120 or frame memory 130 via memory controller section 190.

At the same time as pixel generation section 154 writes drawing data to frame memories 120 and 130, texture load section 153 reads texture data of the next graphics from frame memories 120 and 130.

Furthermore, in the present embodiment, after the texture data is transferred from system memory 110 to frame memories 120 and 130, drawing section 150 reads texture data from frame memories 120 and 130.

Drawing section 150 reads video data written by video input section 140 to frame memories 120 and 130 as texture data.

Texture load section 153 and pixel generation section 154 perform data transfers to/from memory controller section 190 in parallel. For this reason, data buses through which texture load section 153 and pixel generation section 154 access memory controller section 190 need to be independent of each other.

Furthermore, texture load section 153 and pixel generation section 154 access different texture memories.

Hereinafter, operation of image processing apparatus 100 configured as described above will be described.

[Video Input Section 140]

Figure 3:
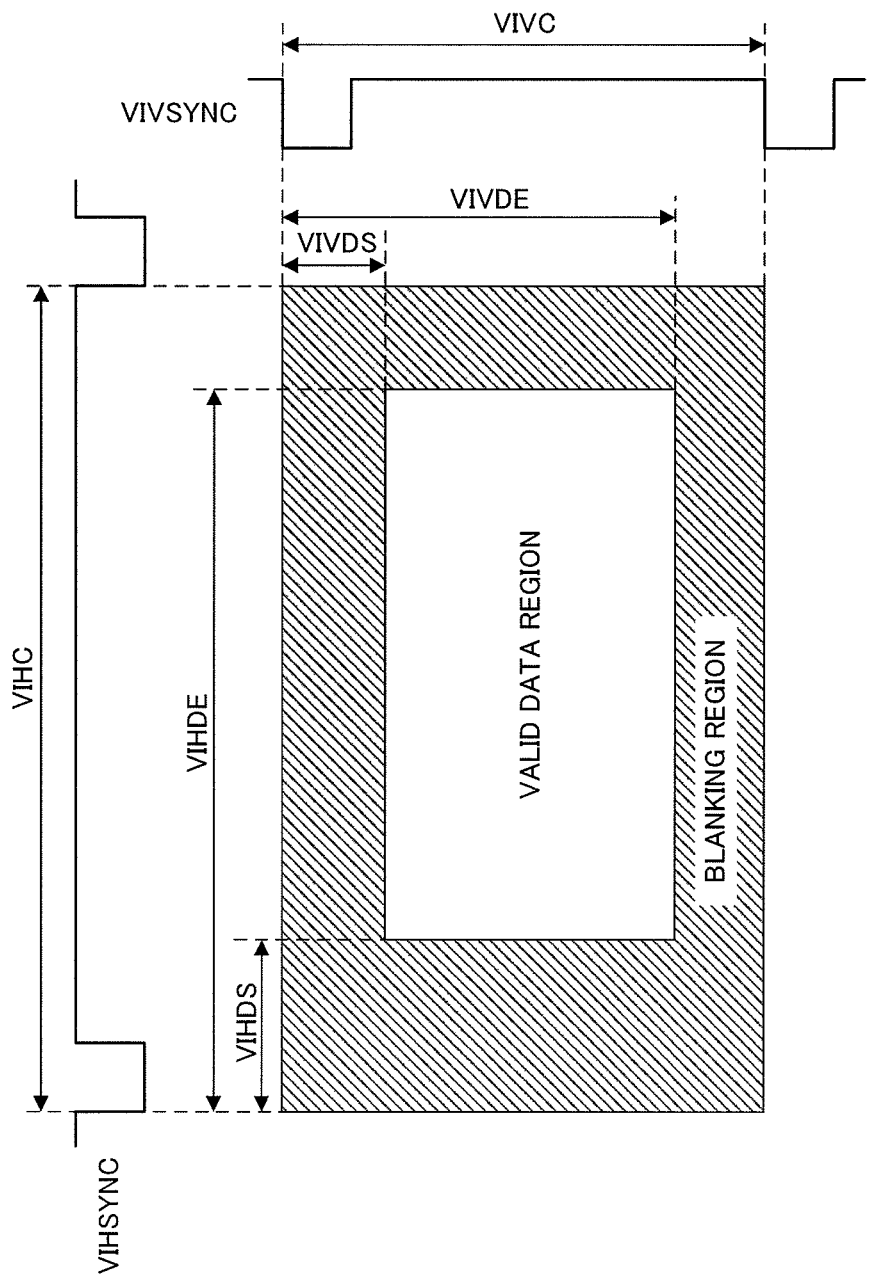
FIG. 3 is a diagram illustrating a valid data region and a blanking region of a video input of the video input section of the image processing apparatus according to Embodiment 1.

FIG. 3 is a diagram illustrating a valid data region and a blanking region of a video input of video input section 140.

Horizontal synchronization signal VIHSYNC is inputted to video input section 140 in a cycle of period VIHC.

Vertical synchronization signal VIVSYNC is inputted to video input section 140 in a cycle of period VIVC.

Using a fall of VIHSYNC as a reference, a period from the number of cycles VIHDS to VIHDE at video input clock VICLK (not shown) is a valid data region in the horizontal direction, and using a fall of VIVSYNC as a reference, a period from the number of horizontal lines VIVDS to VIVDE is a valid data region in the vertical direction.

In the case of WVGA (800 pixels (W)×480 pixels (H)), a frequency of 33 MHz is used for VICLK. On the other hand, the frequency for VICLK varies depending on the total number of pixels.

Figure 4:
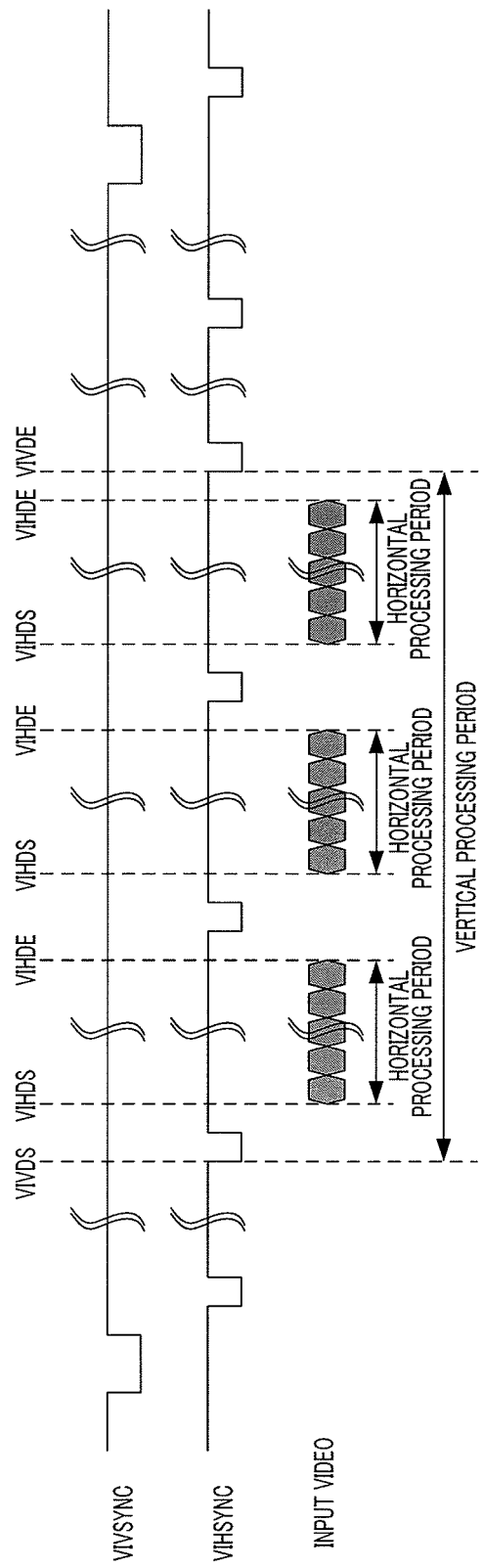
FIG. 4 is a timing chart illustrating processing timing of the video input section of the image processing apparatus according to Embodiment 1.

FIG. 4 is a timing chart illustrating processing timing of video input section 140.

In FIG. 4, a period from VIVDS to VIVDE is a vertical processing period and a period from VIHDS to VIHDE is a horizontal processing period. Video input section 140 writes video data to frame memory 120 or frame memory 130 via memory controller section 190 during the horizontal processing period. Furthermore, video input section 140 outputs a flag to control section 180 at timings of VIVDS, VIVDE, VIHDS and VIHDE.

[Video Output Section 160]

Figure 5:
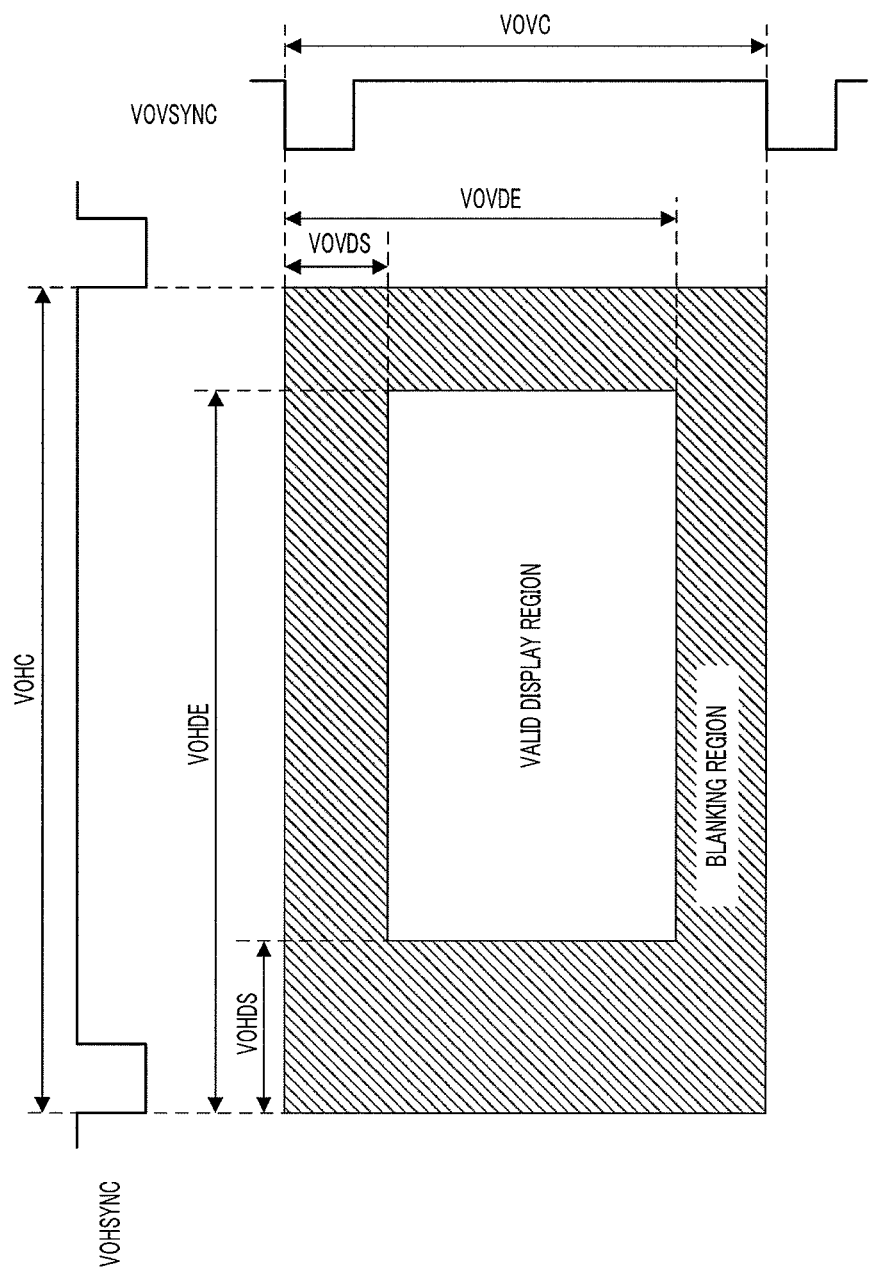
FIG. 5 is a diagram illustrating a valid display region and a blanking region of the video output of the video output section of the image processing apparatus according to Embodiment 1.

FIG. 5 is a diagram illustrating a valid display region and a blanking region of video output of video output section 160.

Horizontal synchronization signal VOHSYNC is outputted from video output section 160 and inputted to display 170 in a cycle of period VOHC.

Vertical synchronization signal VOVSYNC is outputted from video output section 160 and inputted to display 170 in a cycle of period VOVC.

Using a fall of VOHSYNC as a reference, a period from the number of cycles VOHDS to VOHDE at video output clock VOCLK (not shown) is a valid display region in the horizontal direction, and using a fall of VOVSYNC as a reference, a period from the number of horizontal lines VOVDS to VOVDE is a valid display region in the vertical direction.

In the case of WVGA (800 pixels (W)×480 pixels (H)), a frequency of 33 MHz is used for VOCLK. Furthermore, the frequency of VOCLK varies depending on a total number of pixels.

Figure 6:
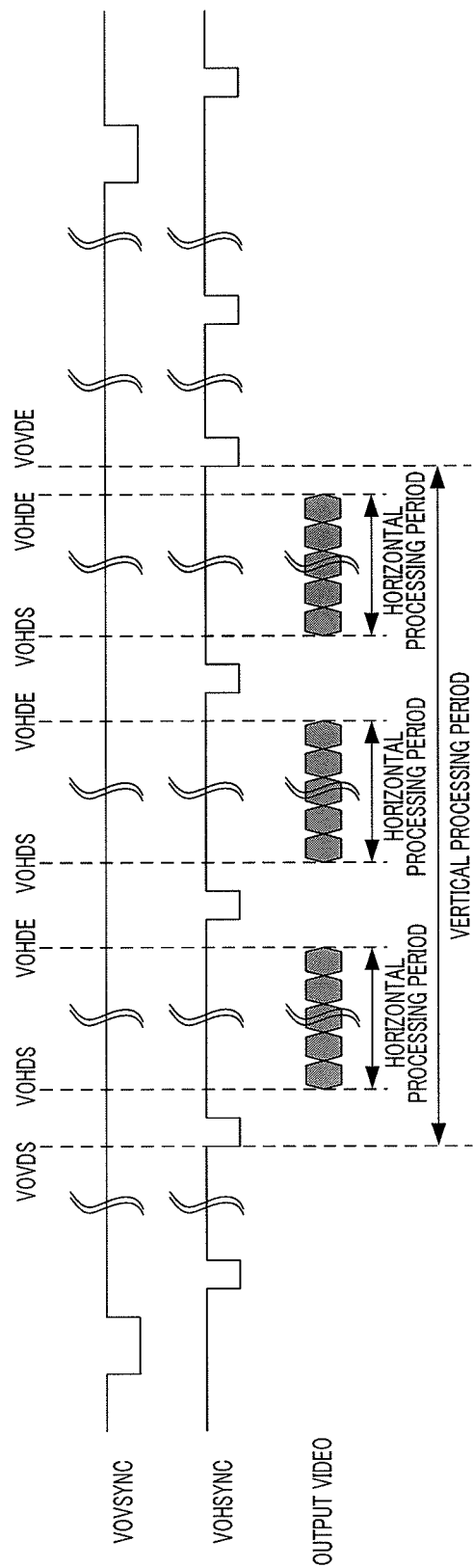
FIG. 6 is a timing chart illustrating processing timing of the video output section of the image processing apparatus according to Embodiment 1.

FIG. 6 is a timing chart illustrating processing timing of video output section 160.

In FIG. 6, a period from VOVDS to VOVDE is a vertical processing period and a period from VOHDS to VOHDE is a horizontal processing period. Video output section 160 reads image data from frame memory 120 or frame memory 130 via memory controller section 190 during a horizontal processing period and outputs the image data to display 170. Furthermore, video output section 160 outputs a flag to control section 180 at timings of VOVDS, VOVDE, VOHDS and VOHDE.

[When Three Banks (Banks 0 to 2) are Allocated to Frame Memories 120 and 130]

FIG. 7 is a diagram illustrating memory contents when three banks (banks 0 to 2) accessed by video input section 140 and video output section 160 are allocated to frame memory 120 and frame memory 130.

Control section 180 sets image sizes and base addresses of the banks allocated to frame memory 120 and frame memory 130 in video input section 140 and video output section 160. In the example of FIG. 7, bank 0 and bank 2 which are even-numbered banks are allocated to frame memory 120 and bank 1 which is an odd-numbered bank is allocated to frame memory 130.

First, a case where VIVSYNC and VOVSYNC have the same cycle will be described.

Figure 8:
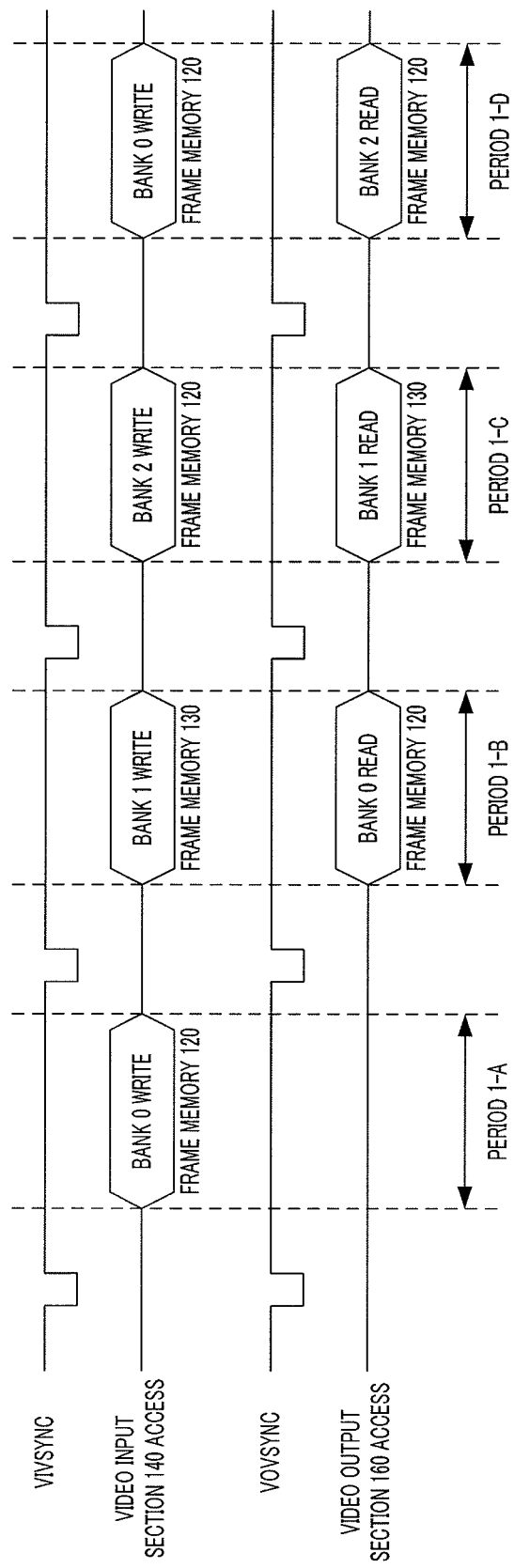
FIG. 8 is a timing chart illustrating timing at which the video input section and the video output section access a frame memory and a bank allocated to the frame memory when VIVSYNC and VOVSYNC of the image processing apparatus according to Embodiment 1 have the same cycle.

FIG. 8 is a timing chart illustrating timing at which video input section 140 and video output section 160 access banks allocated to frame memory 120 and frame memory 130 when VIVSYNC and VOVSYNC have the same cycle.

The period during which video input section 140 writes data to each bank is the same as the vertical processing period in FIG. 4. Furthermore, the period during which video output section 160 reads data from each bank is the same as the vertical processing period in FIG. 6.

During period 1-A, video input section 140 writes data to bank 0 allocated to frame memory 120.

Control section 180 recognizes to which bank video input section 140 starts writing data from a VIVDS flag outputted from video input section 140 and recognizes that video input section 140 has ended the data write from a VIVDE flag.

During period 1-B, at the same time as video input section 140 writes data to bank 1 allocated to frame memory 130, video output section 160 reads data of bank 0 allocated to frame memory 120.

Video output section 160 is controlled by control section 180 so as to read the last bank to which video input section 140 completed a data write. Video output section 160 may receive the VIVDE flag outputted from video input section 140 and video output section 160 may recognize the last bank to which video input section 140 completed a data write without going through control section 180.

During period 1-C, at the same time as video input section 140 writes data to bank 2 allocated to frame memory 120, video output section 160 reads the data of bank 1 allocated to frame memory 130.

During period 1-D, video input section 140 writes data to bank 0 allocated to frame memory 120 and video output section 160 reads data of bank 2 allocated to frame memory 120. Since video input section 140 and video output section 160 access the same frame memory 120 during this period, there is a period during which those sections cannot access the memory simultaneously and need to wait for processing.

During period 1-B and period 1-C, a memory write by video input section 140 and a memory read by video output section 160 can be realized simultaneously, and therefore processing can be performed at a high speed.

Furthermore, since control section 180 can keep track of memory access start/end timing of video input section 140 and video output section 160 and which frame memory is being accessed, control section 180 recognizes that only frame memory 130 is in a non-access state during period 1-A and period 1-D and both frame memory 120 and frame memory 130 are in a non-access state during periods except periods 1-A to 1-D.

Thus, control section 180 can perform processing such as calculation on a frame memory in a non-access state and can thereby improve overall system performance.

Furthermore, by adopting a total of four banks such as bank 0 and bank 2 for frame memory 120 and bank 1 and bank 3 for frame memory 130, it is possible to prevent video input section 140 and video output section 160 from accessing the same frame memory as in the case of period 1-D.

Next, a case where the cycle of VIVSYNC is shorter than the cycle of VOVSYNC will be described.

Figure 9:
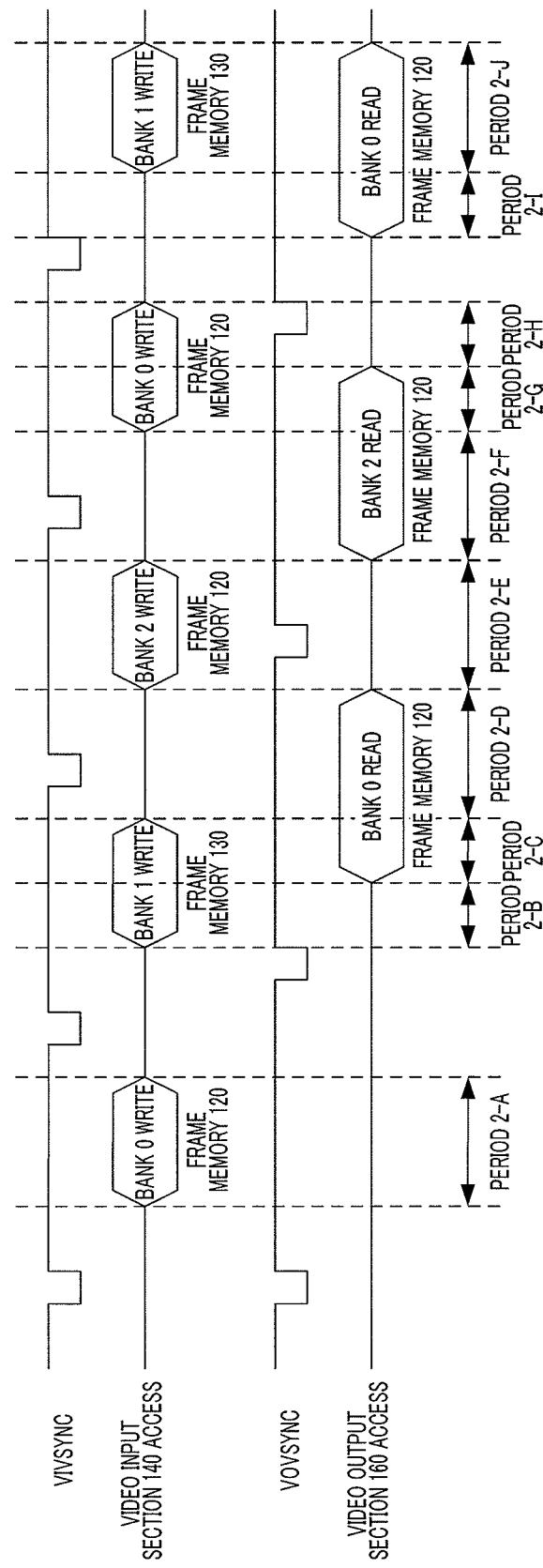
FIG. 9 is a timing chart illustrating timing at which the video input section and the video output section access a frame memory and a bank allocated to the frame memory when the cycle of VIVSYNC is shorter than the cycle of VOVSYNC of the image processing apparatus according to Embodiment 1.

FIG. 9 is a timing chart illustrating timing at which video input section 140 and video output section 160 access banks allocated to frame memory 120 and frame memory 130 when the cycle of VIVSYNC is shorter than the cycle of VOVSYNC.

During period 2-A, video input section 140 writes data to bank 0 allocated to frame memory 120.

During period 2-B, video input section 140 writes data to bank 1 allocated to frame memory 130.

During period 2-C, at the same time as video input section 140 writes data to bank 1 allocated to frame memory 130, video output section 160 reads the data of bank 0 allocated to frame memory 120.

During period 2-D, video output section 160 reads the data of bank 0 allocated to frame memory 120.

During period 2-E, video input section 140 writes data to bank 2 allocated to frame memory 120.

During period 2-F, video output section 160 reads the data of bank 2 allocated to frame memory 120. Video output section 160 reads not the data of bank 1 but bank 2 because bank 2 is the last bank to which video input section 140 completed a data write. Thus, the display of bank 1 is skipped.

During period 2-G, video input section 140 writes data to bank 0 allocated to frame memory 120 and video output section 160 reads data of bank 2 allocated to frame memory 120. Since video input section 140 and video output section 160 access the same frame memory 120 during this period, there is a period during which those sections cannot access the memory simultaneously and need to wait for processing.

During period 2-H, video input section 140 writes data to bank 0 allocated to frame memory 120.

During period 2-I, video output section 160 reads data of bank 0 allocated to frame memory 120.

During period 2-J, at the same time as video input section 140 writes data to bank 1 allocated to frame memory 130, video output section 160 reads the data of bank 0 allocated to frame memory 120.

During period 2-C and period 2-J, since a memory write by video input section 140 and a memory read by video output section 160 can be performed simultaneously, processing can be performed at a high speed.

Furthermore, control section 180 recognizes that only frame memory 120 is in a non-access state during period 2-B, only frame memory 130 is in a non-access state during period 2-A and period 2-D to 2-I, and both frame memory 120 and frame memory 130 are in a non-access state during periods except period 2-A to 2-J, and can thereby perform processing such as calculations on frame memories in a non-access state and improve overall system performance.

Next, a case where the cycle of VIVSYNC is longer than the cycle of VOVSYNC will be described.

Figure 10:
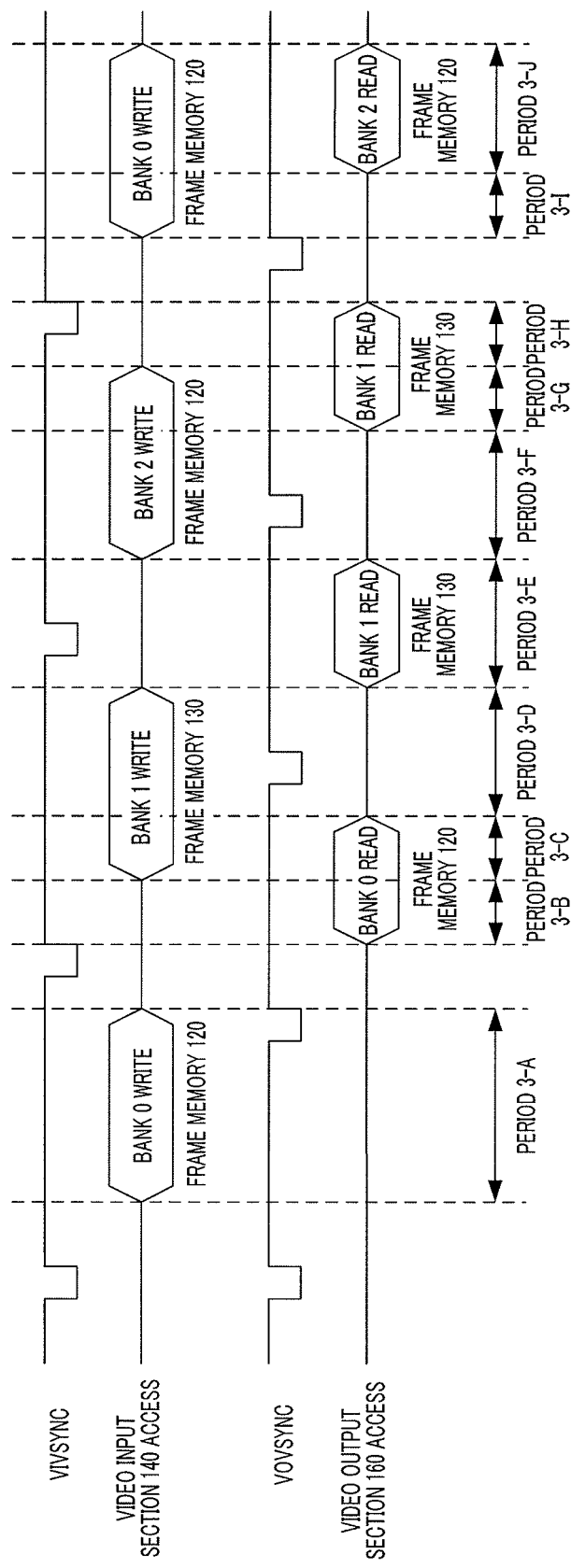
FIG. 10 is a timing chart illustrating timing at which the video input section and the video output section access a frame memory and a bank allocated to the frame memory when the cycle of VIVSYNC is longer than the cycle of VOVSYNC of the image processing apparatus according to Embodiment 1.

FIG. 10 is a timing chart illustrating timings at which video input section 140 and video output section 160 access banks allocated to frame memory 120 and frame memory 130 when the cycle of VIVSYNC is longer than the cycle of VOVSYNC.

During period 3-A, video input section 140 writes data to bank 0 allocated to frame memory 120.

During period 3-B, video output section 160 reads the data of bank 0 allocated to frame memory 120.

During period 3-C, at the same time as video input section 140 writes data to bank 1 allocated to frame memory 130, video output section 160 reads the data of bank 0 allocated to frame memory 120.

During period 3-D, video input section 140 writes data to bank 1 allocated to frame memory 130.

During period 3-E, video output section 160 reads the data of bank 1 allocated to frame memory 130.

During period 3-F, video input section 140 writes data to bank 2 allocated to frame memory 120.

During period 3-G, at the same time as video input section 140 writes data to bank 2 allocated to frame memory 120, video output section 160 reads the data of bank 1 allocated to frame memory 130. Video output section 160 also reads the data of bank during period 3-G following period 3-E because video input section 140 has not completed the data write to bank 2 and bank 1 is the last bank to which the data write was completed.

During period 3-H, video output section 160 reads the data of bank 1 allocated to frame memory 130.

During period 3-I, video input section 140 writes data to bank 0 allocated to frame memory 120.

During period 3-J, video input section 140 writes data to bank 0 allocated to frame memory 120 and video output section 160 reads the data of bank 2 allocated to frame memory 120. During this period, since video input section 140 and video output section 160 access the same frame memory 120, there is a period during which those sections cannot access the memory simultaneously and need to wait for processing.

During period 3-C and period 3-G, since a memory write by video input section 140 and a memory read by video output section 160 can be performed simultaneously, processing can be performed at a high speed.

Furthermore, control section 180 recognizes that only frame memory 120 is in a non-access state during periods 3-D to 3-E and period 3-H, only frame memory 130 is in a non-access state during periods 3-A and 3-B and period 3-F, periods 3-1 and 3-J, and both frame memory 120 and frame memory 130 are in a non-access state during periods except periods 3-A to 3-J, can perform processing such as calculations on frame memories in a non-access state and can thereby improve overall system performance.

[When Three Banks (Banks 0 to 2) are Allocated to Frame Memories 120 and 130, and Moreover Four Banks (Banks RA0, RA1, RB0, RB1) Accessed by Drawing Section 150 and Video Output Section 160 are Allocated]

Figure 11:
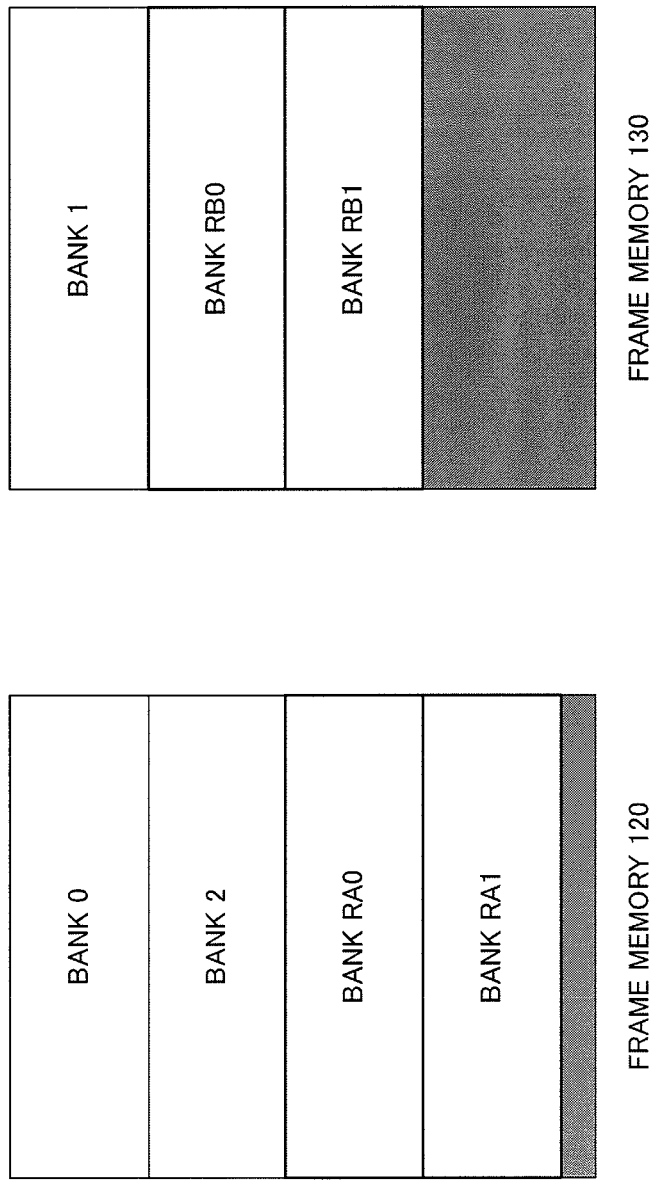
FIG. 11 is a diagram illustrating frame memories of the image processing apparatus according to Embodiment 1 and memory contents when three banks to be accessed by the video input section and the video output section are allocated to the frame memories, and moreover four banks to be accessed by the drawing section and the video output section are allocated.

FIG. 11 is a diagram illustrating memory contents when three banks (banks 0 to 2) accessed by video input section 140 and video output section 160 are allocated to frame memory 120 and frame memory 130, and moreover four banks (banks RA0, RA1, RB0, RB1) accessed by drawing section 150 and video output section 160 are allocated.

Control section 180 sets image sizes and base addresses of the banks allocated to frame memory 120 and frame memory 130 in drawing section 150 and video output section 160.

A double buffer configuration is generally provided which switches between two banks; a bank corresponding to drawing and a bank corresponding to display so that images being drawn are not displayed. As shown in FIG. 11, the present embodiment provides two banks in each of frame memory 120 and frame memory 130 so that video input section 140, drawing section 150 and video output section 160 can perform parallel processing efficiently.

FIG. 12 is a diagram illustrating the bank that control section 180 commands drawing section 150 to access next according to the access situations of video input section 140 and video output section 160.

In FIG. 12, frame memory 120 or frame memory 130 is described in the access situation field of video input section 140 or video output section 160 and this means which frame memory should be accessed next when control section 180 determines which bank to access next by drawing section 150, according to which frame memory video input section 140 and video output section 160 are each accessing or which frame memory frame memory video input section 140 and video output section 160 will access next when they are accessing none of the frame memories. The bank to which drawing section 150 completed access last time is accessed by video output section 160 to read data to be displayed.

As a reference for drawing section 150 to determine the bank to access next, a bank allocated to the frame memory having the least factor to be accessed is selected based on the access situation of video input section 140, the access situation of video output section 160 and the bank to which drawing section 150 completed access last time.

This increases the frequency with which video input section 140, drawing section 150 and video output section 160 can access frame memory 120 and frame memory 130 in parallel and can thereby improve performance.

Furthermore, also when a total of two banks accessed by drawing section 150 and video output section 160 are allocated; one to frame memory 120 and one to frame memory 130, it is possible to improve performance by specifying a bank allocated to the frame memory having the least factor to be accessed as the bank to access next by drawing section 150 based on the access situation of video input section 140, the access situation of video output section 160 and the bank to which drawing section 150 completed access last time.

For video input section 140 as in the case of drawing section 150, a bank allocated to the frame memory having the least factor to be accessed may be selected as the bank to access next based on the access situation of video input section 140, the access situation of drawing section 150, the access situation of video output section 160 and the bank to which video input section 140 completed access last time.

Next, operation of drawing section 150 will be described.

Figure 13:
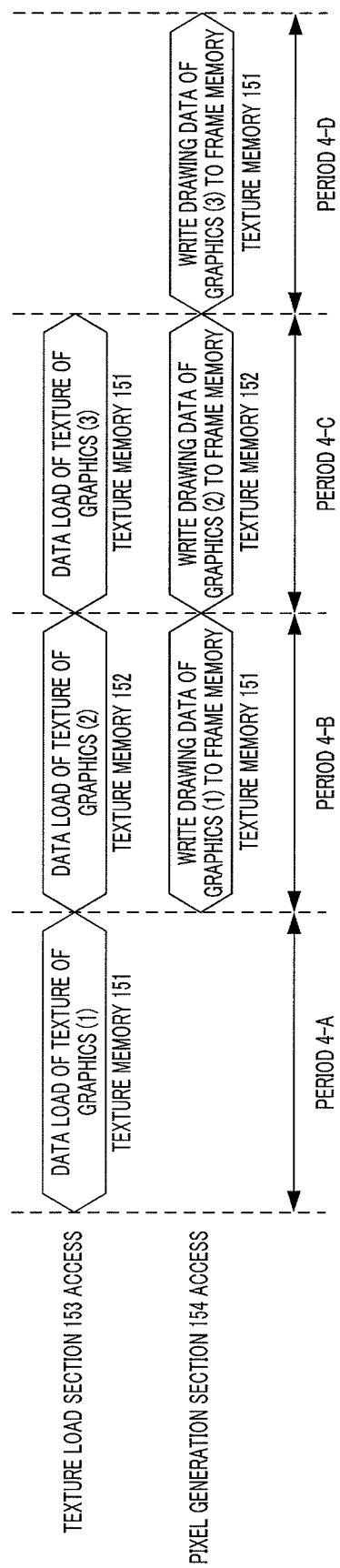
FIG. 13 is a timing chart illustrating timing at which the texture load section and the pixel generation section of the image processing apparatus according to Embodiment 1 access a texture memory and a memory controller section.

FIG. 13 is a timing chart illustrating timing at which texture load section 153 and pixel generation section 154 access texture memories 151 and 152 and memory controller section 190.

During period 4-A, texture load section 153 reads texture data of graphics (1) stored in system memory 110 and writes the texture data to texture memory 151.

During period 4-B, at the same time as texture load section 153 reads texture data of graphics (2) stored in system memory 110 and writes the texture data to texture memory 152, pixel generation section 154 reads the texture data of graphics (1) stored in texture memory 151, generates drawing data of graphics (1) and writes the drawing data to frame memory 120 or frame memory 130.

During period 4-C, at the same time as texture load section 153 reads texture data of graphics (3) stored in system memory 110 and writes the texture data to texture memory 151, pixel generation section 154 reads the texture data of graphics (2) stored in texture memory 152, generates drawing data of graphics (2) and writes the drawing data to frame memory 120 or frame memory 130.

During period 4-D, pixel generation section 154 reads texture data of graphics (3) stored in texture memory 151, generates drawing data of graphics (3) and writes the drawing data to frame memory 120 or frame memory 130.

During period 4-B and period 4-C, processing by texture load section 153 and that by pixel generation section 154 can be executed simultaneously and processing can thereby be performed at a high speed.

When, for example, system memory 110 is a low-speed memory such as flash memory and frame memory 120 or frame memory 130 is a high-speed memory such as SDRAM, after transferring texture data from system memory 110 to frame memory 120 or frame memory 130, texture load section 153 may read the texture data from frame memory 120 or frame memory 130.

Furthermore, texture load section 153 may also read the video data written by video input section 140 to frame memory 120 or frame memory 130 as texture data.

As described above, the present embodiment eliminates the necessity for video input section 140 and drawing section 150 to have respective dedicated frame memories, allows video input section 140, drawing section 150 and video output section 160 to process the two frame memories in parallel, further allows drawing section 150 to process two graphics in parallel, and can thereby improve processing performance at low cost.

As described in detail above, according to the present embodiment, image processing apparatus 100 is provided with memory controller section 190 that divides and allocates banks accessed by video input section 140, drawing section 150 and video output section 160 between/to a plurality of frame memories 120 and 130, arbitrates between access requests from master sections such as video input section 140, drawing section 150 and video output section 160 and controls data transfers so that the plurality of master sections can access frame memories 120 and 130 in parallel and memory controller section 190 selects, when each master section determines which bank to access next, a bank allocated to the frame memory having the least factor to be accessed based on the access situation of each master section to each frame memory 120 or 130.

For example, memory controller section 190 divides and allocates a plurality of banks accessed by drawing section 150 and video output section 160 between/to a plurality of frame memories 120 and 130 and selects, when drawing section 150 determines which bank to access next, a bank allocated to a frame memory 120 or 130 having the least factor to be accessed based on information about which of frame memories 120 and 130 video input section 140 and video output section 160 are each accessing or information about which of frame memories 120 and 130 is to access next when none of frame memories 120 and 130 is being accessed and information of the bank to which drawing section 150 completed access last time.

Furthermore, memory controller section 190 selects, when video input section 140 determines which bank to access next, a bank allocated to frame memory 120 or 130 having the least factor to be accessed based on information about which of frame memories 120 and 130 drawing section 150 and video output section 160 are each accessing or information about which of frame memories 120 and 130 is to access next when none of frame memories 120 and 130 is being accessed.

In the conventional example, a frame memory having a double buffering region corresponding to a plurality of video input images and graphics is used. In contrast to this, in the present embodiment, such a function is realized by memory controller section 190 selecting a bank allocated to the frame memory having the least factor to be accessed based on the access situation of each master section. This eliminates the necessity of having frame memories corresponding to video input images and drawings, can perform access to frame memories for video input, drawing and display in parallel, and can thereby improve processing performance at low cost.

(Embodiment 2)

Figure 14:
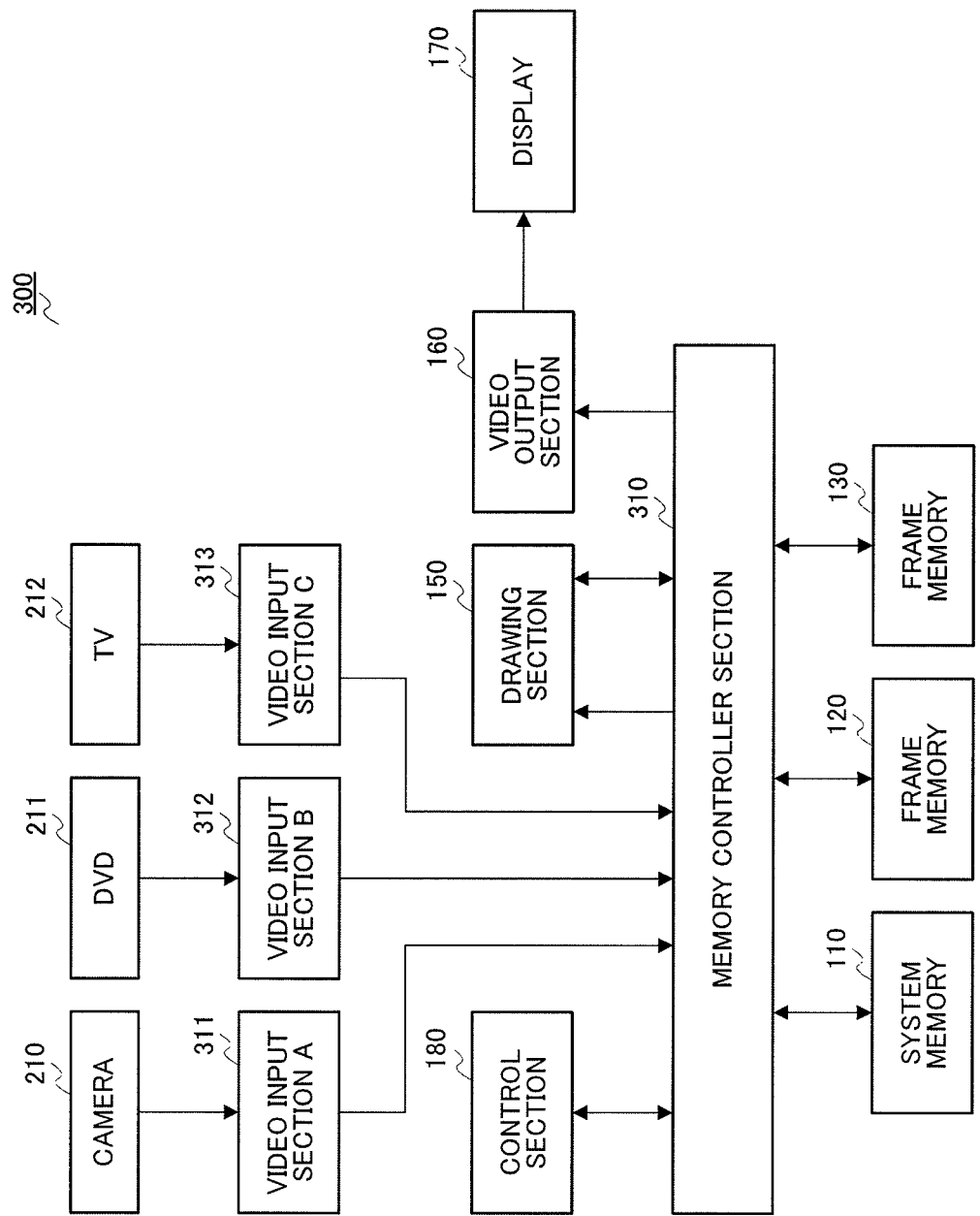
FIG. 14 is a block diagram illustrating a configuration of an image processing apparatus according to Embodiment 2 of the present invention.

FIG. 14 is a block diagram illustrating a configuration of an image processing apparatus according to Embodiment 2 of the present invention. The same components as those in FIG. 1 will be assigned the same reference numerals and overlapping descriptions thereof will be omitted.

In FIG. 14, image processing apparatus 300 is comprised of system memory 110, frame memory 120, frame memory 130, video input sections 311, 312 and 313, drawing section 150, video output section 160, display 170, control section 180 and memory controller section 310. Furthermore, camera 210, DVD 211 and TV 212 are connected to memory controller section 310 via video input sections 311, 312 and 313.

Video input section 311 writes video data to frame memory 120 or frame memory 130 via memory controller section 310 based on a vertical synchronization signal and a horizontal synchronization signal of video outputted from camera 210.

Video input section 312 writes video data to frame memory 120 or frame memory 130 via memory controller section 310 based on a vertical synchronization signal and a horizontal synchronization signal of video outputted from DVD 211.

Video input section 312 writes video data to frame memory 120 or frame memory 130 via memory controller section 310 based on a vertical synchronization signal and a horizontal synchronization signal of video outputted from TV 212.

Memory controller section 310 arbitrates between memory access requests from master sections such as video input section 311, video input section 312, video input section 313, drawing section 150, video output section 160 and control section 180 and controls data transfers so that a plurality of master sections can access system memory 110, frame memory 120 and frame memory 130 in parallel.

Figure 15:
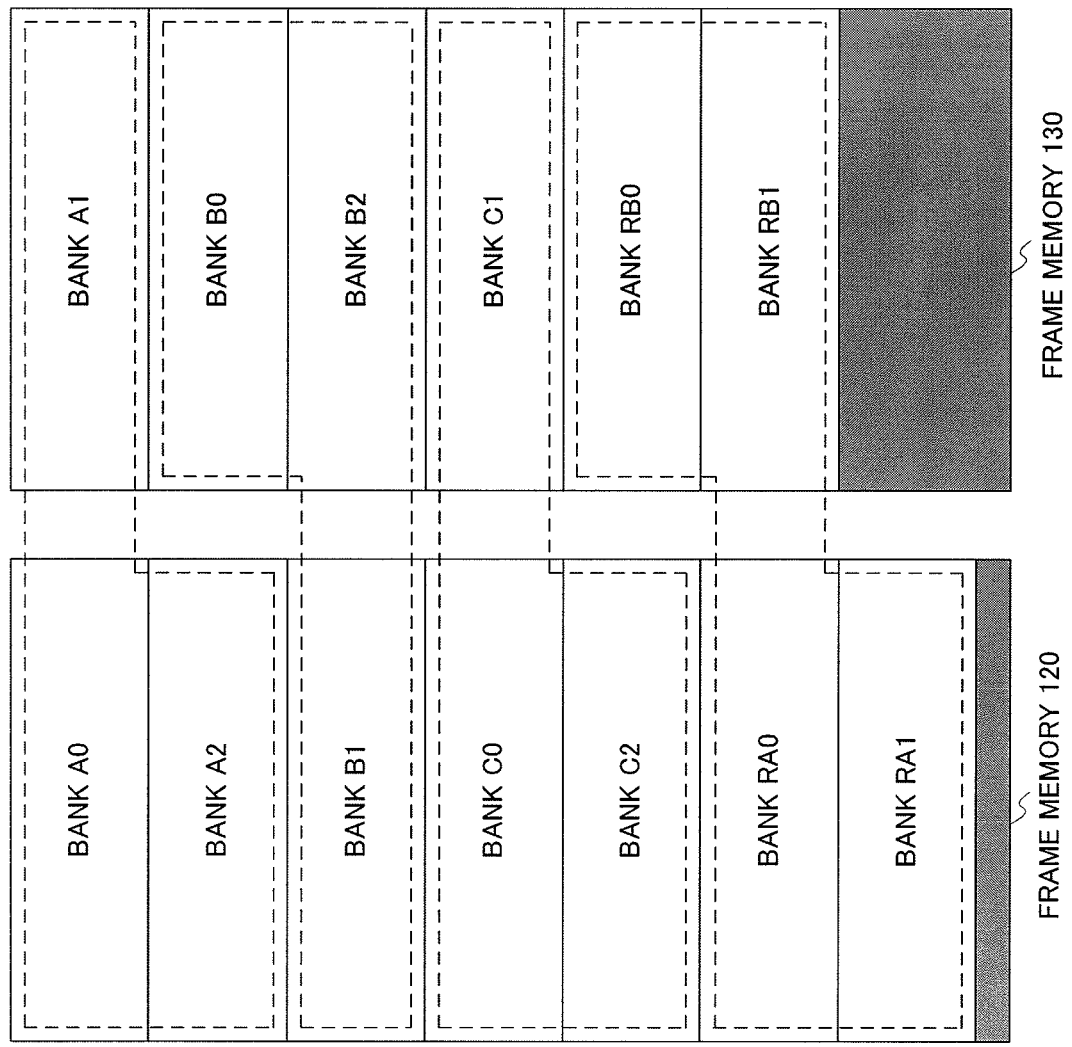
FIG. 15 is a diagram illustrating frame memories of the image processing apparatus according to Embodiment 2 and memory contents when three banks to be accessed by each video input section and video output section, a total of nine banks are allocated to the frame memories, and moreover four banks to be accessed by the drawing section and the video output section are allocated.

FIG. 15 is a diagram illustrating memory contents when three banks accessed by video input section 311, video input section 312, video input section 313 and video output section 160, a total of nine banks (banks A0 to 2, banks B0 to 2, banks C0 to 2) are allocated to frame memory 120 and frame memory 130, and further four banks (banks RA0, RA1, RB0, RB1) accessed by drawing section 150 and video output section 160 are allocated.

Thus, by causing banks for video input section 311, video input section 312, video input section 313 and drawing section 150 to be divided and allocated between/to frame memory 120 and frame memory 130 and by specifying a bank allocated to the frame memory having the least factor to be accessed as the bank to access next by drawing section 150 based on the access situations of video input section 311, video input section 312 and video input section 313, the access situation of video output section 160 and the bank to which drawing section 150 completed access last time, the frequency with which video input section 311, video input section 312, video input section 313, drawing section 150 and video output section 160 can access frame memory 120 and frame memory 130 in parallel, and can thereby improve performance.

As in the case of drawing section 150, for video input section 311, video input section 312 and video input section 313, a bank allocated to the frame memory having the least factor to be accessed may also be selected as the bank to access next based on the access situations of other video input sections, the access situation of drawing section 150, the access situation of video output section 160 and the banks to which video input section 311, video input section 312 and video input section 313 completed access last time respectively.

As described above, according to the present embodiment, memory controller section 310 arbitrates between memory access requests from master sections such as video input section 311, video input section 312, video input section 313, drawing section 150, video output section 160 and control section 180 and controls data transfers so that a plurality of master sections can access system memory 110, frame memory 120 and frame memory 130 in parallel, and it is thereby possible to perform parallel processing with drawing section 150 and video output section 160 even in the configuration having a plurality of video input sections, and thereby improve processing performance.

The above descriptions are illustrative of the preferred embodiments of the present invention, but the scope of the present invention is not limited to this. For example, the above described embodiments have described a case where the present invention is applied to various electronic devices, but the present invention is likewise applicable to any device that displays an input target in a space.

A term "image processing apparatus" has been used in the above described embodiments, but it goes without saying that this is for convenience of explanation, and the term may also be an "image processing system," "image output apparatus" or the like.

Furthermore, the type, number and connection method or the like of each apparatus such as memory making up the above described image processing apparatus are not limited to those of the aforementioned embodiments.

The disclosure of Japanese Patent Application No. 2008-209271, filed on Aug. 15, 2008, including the specification, drawings and abstract, is incorporated herein by reference in its entirety.

INDUSTRIAL APPLICABILITY

The present invention can process video inputs, drawings and displays at a high speed, and can thereby speedily display various images such as an operation screen of an air conditioner, car navigation screen, video of DVD and TV superimposed on each other on, for example, a car-mounted display. The present invention is also widely applicable to an image processing system in each electronic device other than a car-mounted display.

REFERENCE SIGNS LIST 100, 300 Image processing apparatus
110 System memory
120, 130 Frame memory
140, 311, 312, 313 Video input section
150 Drawing section
151, 152 Texture memory
153 Texture load section
154 Pixel generation section
160 Video output section
170 Display
180 Control section
190, 310 Memory controller section
210 Camera
211 DVD
212 TV
213 Video selection section

The invention claimed is:

1. An image processing apparatus comprising:
a plurality of frame memories;
a plurality of masters that access the plurality of frame memories, the plurality of masters include at least a video inputter and a video outputter;
a memory controller that arbitrates between access requests from the plurality of masters and controls data transfers so that the plurality of masters access the respective frame memories in parallel;
the video inputter writing image input data to the plurality of frame memories via the memory controller; and
the video outputter reading the data stored in the plurality of frame memories through the memory controller and displaying the data on a display,
wherein the memory controller divides and allocates a plurality of banks, accessed by the video inputter and the video outputter, between and to the plurality of frame memories, and the video outputter reads a last bank to which the video inputter completed a write.

2. The image processing apparatus according to claim 1, further comprising:
a system memory;
the memory controller that controls data transfers so that the plurality of masters access the system memory and the plurality of frame memories in parallel; and
a controller that controls timing of the video inputter, the video outputter and the memory controller, based on an application program stored in the system memory, and writes a calculation result to a frame memory via the memory controller.

3. The image processing apparatus according to claim 2, wherein the controller writes the calculation result to the frame memory which is in a non-access state, based on memory access start/end timing of the video inputter and the video outputter and information accessing the plurality of frame memories.

4. The image processing apparatus according to claim 2, further comprising a drawer that reads texture data stored in the system memory via the memory controller and writes drawing data, resulting from applying texture mapping and alpha blending processing to a graphic, including at least one of a line, a triangle and a rectangle to the frame memories via the memory controller based on a command from the controller.

5. The image processing apparatus according to claim 4, wherein the memory controller divides and allocates a plurality of banks accessed by the drawer and the video outputter between and to the plurality of frame memories, and selects, when the drawer determines whether or not to access a next bank, a bank allocated to a frame memory having a least factor to be accessed, based on information about whether the video inputter and the video outputter are accessing the frame memories respectively or whether or not to access a next frame memory while accessing none of the frame memories and information about a bank to which the drawer completed access last time.

6. The image processing apparatus according to claim 4, wherein the memory controller selects, when the video inputter determines whether or not to access a bank next time, a bank allocated to a frame memory having a least factor to be accessed based on information about whether the drawer and the video outputter are accessing the corresponding frame memories respectively or whether or not to access a next frame memory while accessing none of the frame memories, and information about the bank to which the video inputter completed access last time.

7. The image processing apparatus according to claim 4, wherein the drawer comprises:
two texture memories;
a texture loader that reads the texture data stored in the system memory via the memory controller and writes texture data to one texture memory of the two texture memories; and
a pixel generator that reads the texture data stored in an other texture memory of the two texture memories, performs texture mapping or alpha blending processing on the graphic, including at least one of the line, the triangle and the rectangle, and writes drawing data generated to the frame memories via the memory controller, wherein at the same time as the pixel generator writes the drawing data to the frame memory, the texture loader reads texture data of the next graphics from the frame memory.

8. The image processing apparatus according to claim 4, wherein after transferring the texture data from the system memory to the frame memory, the drawer reads the texture data from the frame memory.

9. The image processing apparatus according to claim 4, wherein the drawer reads video data written by the video inputter to the frame memory as the texture data.

10. The image processing apparatus according to claim 4, wherein the video signal input to the video inputter is one video signal selected from a plurality of video signals.

11. The image processing apparatus according to claim 4, further comprising a plurality of the video inputters,
wherein the plurality of banks accessed by the drawer and the plurality of video inputters are divided and allocated between and to the plurality of frame memories and when the drawer determines whether or not to access a bank next time, a bank allocated to the frame memory having a least factor to be accessed is selected, based on information about whether or not the plurality of video inputters and the video outputter are accessing the frame memories respectively or whether or not to access the frame memories next time while accessing none of the frame memories and information about the bank to which the drawer completed access last time.

12. The image processing apparatus according to claim 4, further comprising a plurality of the video inputters,
wherein the plurality of banks accessed by the drawer and the plurality of video inputters are divided and allocated between and to the plurality of frame memories, and when one of the plurality of video inputters determines whether or not to access a bank the next time, a bank allocated to a frame memory having a least factor to be accessed is selected, based on information about whether or not an other video inputter, the drawer and the video outputter are accessing the frame memories respectively or whether or not to access the frame memories next time while accessing none of the frame memories and information about the bank to which one of the plurality of video inputters completed access last time.

* * * * *